(12) United States Patent
Hamm et al.

(10) Patent No.: US 8,381,992 B2
(45) Date of Patent: Feb. 26, 2013

(54) ELECTRONIC CARD HAVING CONTROL MEANS

(75) Inventors: Alain Hamm, Lignières (CH); Emile Grosjacques, Cortaillod (CH); Fabrizio Vige, Marin (CH); Jérôme Fabrizio, Neuchâtel (CH)

(73) Assignee: EM Microelectronic-Marin SA, Marin (CH)

( * ) Notice: Subject to any disclaimer, the term of this patent is extended or adjusted under 35 U.S.C. 154(b) by 96 days.

(21) Appl. No.: 12/628,618

(22) Filed: Dec. 1, 2009

(65) Prior Publication Data
US 2010/0140359 A1    Jun. 10, 2010

(30) Foreign Application Priority Data
Dec. 2, 2009 (EP) .................................... 08020862

(51) Int. Cl.
*G06K 19/06* (2006.01)
(52) U.S. Cl. .................... 235/492; 235/451; 235/380
(58) Field of Classification Search .................. 235/381, 235/439, 451, 487, 492
See application file for complete search history.

(56) References Cited

U.S. PATENT DOCUMENTS

| | | | |
|---|---|---|---|
| 6,472,246 B1 * | 10/2002 | Thomas et al. | 438/64 |
| 2002/0180584 A1 * | 12/2002 | McGregor et al. | 340/5.26 |
| 2003/0085286 A1 | 5/2003 | Kelley et al. | |
| 2005/0045729 A1 * | 3/2005 | Yamazaki | 235/492 |
| 2006/0097059 A1 | 5/2006 | Miyazaki | |
| 2008/0150905 A1 | 6/2008 | Grivna et al. | |
| 2008/0265795 A1 | 10/2008 | Hente et al. | |

FOREIGN PATENT DOCUMENTS

| | | |
|---|---|---|
| EP | 0 665 508 A2 | 8/1995 |
| EP | 0 838 737 A1 | 4/1998 |
| EP | 1 912 113 A2 | 4/2008 |

* cited by examiner

*Primary Examiner* — Kristy A Haupt
(74) *Attorney, Agent, or Firm* — Sughrue Mion, PLLC

(57) ABSTRACT

The electronic card comprises at least one integrated circuit disposed on a printed circuit board, connection means to an electrical supply source connected to the printed circuit board in order to supply said integrated circuit, and control means which can be actuated manually and are connected to the integrated circuit. The integrated circuit is provided for processing signals generated by the control means. Said integrated circuit, the control means at least a part of connection means to and the supply source are enclosed in at least one layer of insulating material forming said card. The control means are formed by an assembly of electrodes in order to define a touch screen with capacitive keys which can each be activated by means of a finger (D) of a user or a pen placed on one contact surface of the card opposite at least one touch key for introduction of data or a command. A conductive shielding screen is provided on one side of the electrodes of the capacitive keys which is opposite the contact surface.

15 Claims, 2 Drawing Sheets

ELECTRONIC CARD HAVING CONTROL MEANS

This application claims priority from European Patent Application No. 08020862.2 filed Dec. 2, 2008, the entire disclosure of which is incorporated herein by reference.

FIELD OF THE INVENTION

The invention relates to an electronic card, such as a smart card, which comprises integrated control means. The electronic card comprises at least one integrated circuit which can be disposed on a printed circuit board, connection means to an electrical supply source in order to supply said integrated circuit, and control means which can be actuated manually and are connected to the integrated circuit. Said integrated circuit is provided mainly for processing signals generated by the control means. The integrated circuit, the control means and at least a part of the connection means to the supply source are enclosed or encapsulated in at least one layer of an insulating material forming said card.

BACKGROUND OF THE INVENTION

Connection means can include an area with electrical contacts, which are accessible over at least one external surface of the card in order to come into contact with complementary contact terminals for example of an electronic instrument to be connected to an electrical supply source. Connection means can also include an antenna to be connected to a supply source by inductive coupling.

An electronic card provided with all the electronic components can be of a general rectangular shape. However, this electronic card can also be of another profile, for example of a general circular shape. This electronic card, such as a smart card, must be of low thickness, for example less than 2 mm, and preferably close to 0.8 mm. Such an electronic card can be conventionally a card of the bank type, in particular according to the ISO standard, but likewise a card in the shape of an electronic device termed Token. Such an electronic device can be of two types, i.e. a first type with a precise integrated time base or a second type which does not require a precise time base.

In the state of the art, such an electronic card can comprise, integrated in an insulating material, a cell or battery, at least one integrated circuit, a device for displaying information and control means connected to the integrated circuit, and also an element in the form of a switch which can be actuated by the user. In order to integrate these various elements in a card, it is generally provided to combine them in the form of at least one electronic module comprising a printed circuit board. The various electronic elements, such as the integrated circuit, the display device, the supply cell or battery and the control means are arranged in part on the printed circuit board. The actuatable switch can be activated manually by the user, in particular to operate the control means and/or the display device.

The control means which are generally used for carrying out at least one function or the introduction of data or commands are produced in the form of push buttons which define dome portions on the exterior surface of the card. With such an arrangement, it is very difficult to reduce significantly the thickness of said electronic card, which comprises several electronic components. This constitutes a major drawback because this does not make it possible to produce in particular a card of the bank type, in particular according to the ISO standard. Furthermore, such control means do not make it possible to ensure good reliability in time for carrying out specific functions or commands, which constitutes another drawback.

SUMMARY OF THE INVENTION

The object of the invention is therefore to provide an electronic card which comprises control means for carrying out certain functions or for introduction of at least one item of data or a command, whilst having a low thickness and ensuring good operating reliability in order to remedy the drawbacks of the state of the art mentioned above.

To this end, the invention relates to an electronic card cited above, wherein it comprises a conductive shielding screen disposed on one side of the electrodes of the capacitive keys which is opposite the contact surface, the conductive screen being remote and without contact to the capacitive keys.

Particular embodiments of the electronic card are defined in the dependent claims 2 to 13.

An advantage of the electronic card according to the invention resides in the fact that the control means in the form of electrodes of the capacitive keys occupy a relatively limited place in the electronic card. Thanks to this, it is possible to reduce the thickness of such an electronic card to the maximum as required.

Advantageously, the distance between a contact surface of the electronic card and the capacitive keys is less than the thickness of the insulating material disposed on an opposite side to the contact surface on the touch keys. This makes it possible for the integrated circuit only to detect the presence of a finger or of a pen in contact on the contact surface opposite at least one of the touch keys to be activated, in particular when the card is held in the hand.

A conductive shielding screen can advantageously be disposed in or on the electronic card. This shielding screen is disposed on one side of the electrodes of the capacitive keys which is opposite the contact surface. This conductive screen is remote and without contact to the capacitive keys. It can be connected to one of the terminals of the supply source.

BRIEF DESCRIPTION OF THE DRAWINGS

The objects, advantages and features of the electronic card will appear more clearly in the following description, in a non-limiting manner, of at least one embodiment illustrated by the drawings in which.

DETAILED DESCRIPTION OF THE DRAWINGS

In the following description, all the parts of the electronic card, which can preferably be a smart card, which are well known to the person skilled in the art in this technical field, are only referred to in a simplified manner.

Figure 1A:
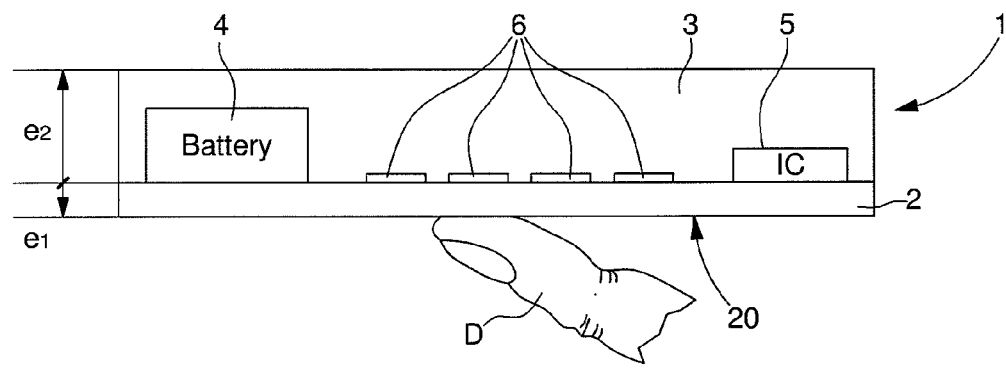
FIG. 1A represents a transverse sectional view of a first embodiment of the electronic card according to the invention.

FIG. 1A represents a simplified transverse section of a first embodiment of an electronic card 1, which can preferably be a smart card, such as bank card according to the ISO standard. In this FIG. 1A and the following, the dimensions of the various parts of the electronic card are not illustrated exactly but solely in order to display more clearly all the parts which comprise said electronic card. It should also be understood that the electronic card can likewise be configured in the form of an electronic badge or an electronic device termed Token.

In this first embodiment, the electronic card 1 comprises at least one integrated circuit 5 disposed on a printed circuit board 2, an electrical supply source 4, such as a cell or battery, connected to the printed circuit board in order to supply said integrated circuit, and control means 6 which can be actuated manually. These control means are connected to the integrated circuit so that a processing unit of the circuit can process the signals generated by the control means. The integrated circuit, the control means and the supply source, which are disposed on the printed circuit board on one face, are enclosed or encapsulated in at least one layer of an insulating material 3, such as plastic material.

In this first embodiment, the layer of insulating material is fixed directly on the printed circuit board, which can be flexible, for example produced in polyimide. During manufacture of said electronic card 1, the layer of insulating material 3 is applied in the form of resin on one face carrying the electronic elements of the printed circuit board 2. This resin can be polyurethane. After a laminating and solidifying operation which is well known for this resin, the electronic card with the integrated electronic elements is thus produced with low thickness, less than 2 mm and preferably close to 0.76 mm, or even less.

The control means are advantageously formed by an assembly of electrodes 6 which define a touch screen with capacitive keys. These electrodes 6 are produced in a conductive material, such as copper. One contact surface 20 is defined on an exterior face of the printed circuit board 2. A finger D or a pen can be placed in contact with this contact surface above at least one capacitive key 6 in order to activate it and hence to make it possible to carry out a specific function or to introduce data or a command.

Figure 1B:
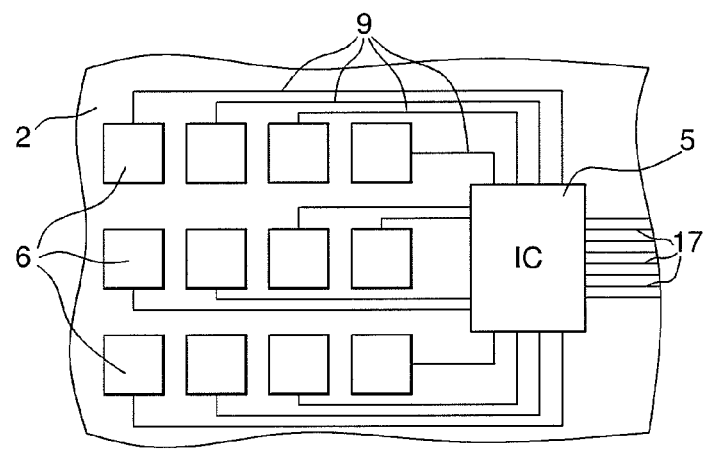
FIG. 1B represents a partial view from above showing the arrangement of the electrodes of the capacitive keys connected to the integrated circuit on the printed circuit board of the electronic card according to the invention.

As shown in FIG. 1B, all the electrodes 6, which are dimensioned as a function of the approximate contact surface of a finger on the contact surface and sufficiently spaced one from the other, are each connected to the integrated circuit by a respective metallic wire 9. Other metallic wires 17 can be provided in order to connect the integrated circuit to a display device which is explained hereafter with reference to FIGS. 2 to 4. Contact areas of the integrated circuit 5 can be connected on the printed circuit board 2, in particular by a technique entitled Flip chip. There can be provided 12 capacitive key electrodes arranged like the keys of a traditional telephone keypad in order to define numbers, letters or symbols. In a normal operating mode, a single capacitive key for each action of the finger D of a user cannot be activated and detected by the integrated circuit. However it can be conceivable that two adjacent keys or more can be activated at the same time in the case of a configuration of the integrated circuit in order to define a computer cursor.

As this electronic card 1 can easily be held in the hand in order to actuate the capacitive keys, it is provided that the processing unit is configured to take into account the distance separating the finger D in contact with the contact surface and the capacitive keys to be activated. In order to do this, it is necessary that the distance e1 between said contact surface 20 and the capacitive key 6 is less than the thickness e2 of the layer of insulating material 3, which is disposed on one side opposite said contact surface relative to the capacitive keys 6. This makes it possible, as a function of a detection threshold determined in the processing unit of the integrated circuit 5, that said processing unit only detects the presence of a finger D in contact on the contact surface opposite at least one of the touch keys to be activated.

Generally, the thickness e2 of this layer of insulating material 3, seen in FIG. 1A, can for example be of the order of 0.45 to 0.5 mm, whereas the thickness e1 of the printed circuit board 2 can for example be of the order of 0.1 to 0.15 mm. For this reason, if the dielectric constant of the layer of insulating material 3 is substantially equivalent to that of the printed circuit board 2, the integrated circuit 5 can be configured only to detect an action of a finger D of a user on the contact surface 20. Of course in the case where the dielectric constant of the printed circuit board is greater than that of the layer of insulating material 3, the difference in thickness can no longer be essential for detecting an action of a finger only on the contact surface.

The processing unit of the integrated circuit 5 generally comprises a multiplexer, to the input of which there are connected all the capacitive keys 6, an analogue oscillator block and a logic block for measurement and comparison. The analogue block can comprise a voltage-controlled oscillator which is connected to the output of the multiplexer. In an initial configuration phase, the multiplexer has the task of connecting successively and periodically each touch key to the input of the oscillator as a function of binary control words provided by the logic block for measurement and comparison.

As the oscillator can be an oscillator of the RC type, the capacitive value of each capacitive key connected to the oscillator will serve to determine an oscillation frequency. This frequency is proportional to the inverse of the value of the total capacitance. Thus, without the action of a finger on the contact surface 20 opposite a capacitive key 6 connected to the oscillator, the frequency of the oscillator is determined only as a function of the capacitive value of a parasitic capacitor of each key. In contrast, when a finger D activates one of the capacitive keys 6, connected to the oscillator, the capacitive value of this key is greater than that solely of the parasitic capacitor. The consequence thereof is to reduce the frequency of the oscillator in order to define a measuring signal relative to the capacitive value of the activated key. A comparison of this measurement signal with a reference signal representing a base capacitive value corresponding to the value of the parasitic capacitance of said key which is initially non-activated, is therefore effected in the logic block. A specific function or introduction of data or a command is carried out if the capacitive value of the activated key is greater than its base capacitive value. Thus, thanks to the arrangement of the described capacitive keys, the logic block is in a position to determine a certain number of positions of the finger on said capacitive keys, for example 12 positions.

For the complementary technical details concerning the processing unit of the integrated circuit, the reader can refer to the patent document EP 0 838 737 which is incorporated here by reference.

The integrated circuit 5 of the electronic card 1 can comprise, in addition to the processing unit of the signals of the electrodes of the capacitive keys 6, in general a memory unit, not represented, which is connected to a microcontroller unit, not represented, for processing data or commands received from the processing unit. The memory unit can comprise a non-volatile memory of the Flash or EEPROM type in order to store personal data, at least one identification code of the smart card and configuration parameters. The memory unit likewise contains in particular at least one encryption algorithm for secure exchange with a reader unit. Furthermore, it can be envisaged in the same integrated circuit to produce a driving circuit of a display device if the electronic card likewise comprises such a display device, as described hereafter with reference to FIGS. 2 to 4.

Of course, it can also be envisaged to mount a plurality of integrated circuits on the same face of the printed circuit board 2. There can be provided an integrated circuit 5 for processing signals generated by the control means 6, an integrated circuit for a memory unit, an integrated circuit for a microcontroller connected to the other integrated circuits and, possibly, a specific driving circuit for controlling a display device, such as an LCD device. The microcontroller defined under the reference EM 6819, manufactured by the company EM Microelectronic-Marin SA in Switzerland, can be used in the electronic card.

The electronic card 1 can comprise also a control member in the form of a switch button, not represented. This well known switch button can be activated from the exterior of the card by a user for a determined duration, for example a duration of 5, 10 or 15 seconds in order to control the operation of the control means by means of the integrated circuit supplied by the battery 4. Without action on the capacitive keys after a duration which can be equivalent to that of operation, said keys are placed in inoperative mode.

Figure 2:
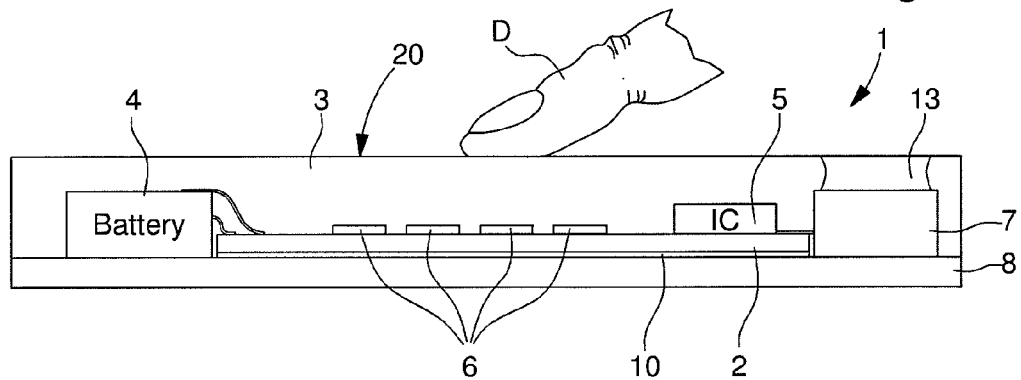
FIG. 2 represents a transverse sectional view of a second embodiment of the electronic card according to the invention.

FIG. 2 represents a transverse section of a second embodiment of the electronic card 1 according to the invention. It should be noted that all the same elements of the electronic card 1 described hereafter carry reference numbers identical to those of FIG. 1. For this reason, for simplification the description of each element for this FIG. 2 will not be repeated in detail.

In this second embodiment, the printed circuit board 2 which can be flexible or rigid comprises, on a single face, at least one integrated circuit 5 and the electrodes of the capacitive keys 6 of the control means, connected to the integrated circuit. The supply source 4 which is a cell or battery, is disposed on one side of the printed circuit board 2 and connected to said board by two metallic straps in order to supply the integrated circuit. A display device, in particular of the LCD type 7, is provided for example on one side of the printed circuit board. This display device 7 is connected by an assembly of tracks or metallic wires to the integrated circuit 5 which can comprise a driving circuit of said display device.

The layer of insulating material comprises a first insulating layer 3 and a second insulating layer 8 which can be of a thickness for example between 0.1 and 0.2 mm. The battery 4, the display device 7, the printed circuit board 2, the integrated circuit 5 and the electrodes of the capacitive keys 6 are encapsulated between the first and the second insulating layers. The encapsulation of these electronic elements can be effected in two steps with firstly production of the second insulating layer, followed by production of the first insulating layer in the same plastic material, fixed on the second insulating layer in order to enclose all the electronic components. However, the first and second layers can also be produced in the same manufacturing step.

There can be provided above the display device, in order to define a visual field of said device, an opening 13 made in the first insulating layer 3. However, instead of the opening, it can be provided that a display portion of the display device 7 is visible through at least one transparent part 13 of the first layer of insulating material 3.

In this second embodiment, the contact surface 20 for activating the capacitive keys is situated on the exterior face of the first insulating layer 3. In this case, the electronic card 1 can comprise also a conductive shielding screen 10 which can be disposed on one side of the electrodes of the capacitive keys 6, which is opposite the contact surface 20. This conductive screen is for example fixed on the second face of the printed circuit board which is opposite the first face on which the electrodes of the capacitive keys 6 are produced.

This screen can be a conductive film, such as a metallic film made of nickel or of copper or a metallic insert. This shielding screen 10 is remote and without direct contact to the capacitive keys 6. It can be connected to a terminal of the battery or remain in a floating state. This shielding screen can entirely cover the second face of the printed circuit board or at least one zone opposite all the capacitive keys 6. A grid instead of a full metallic layer can also be provided as shielding screen.

Figure 3:
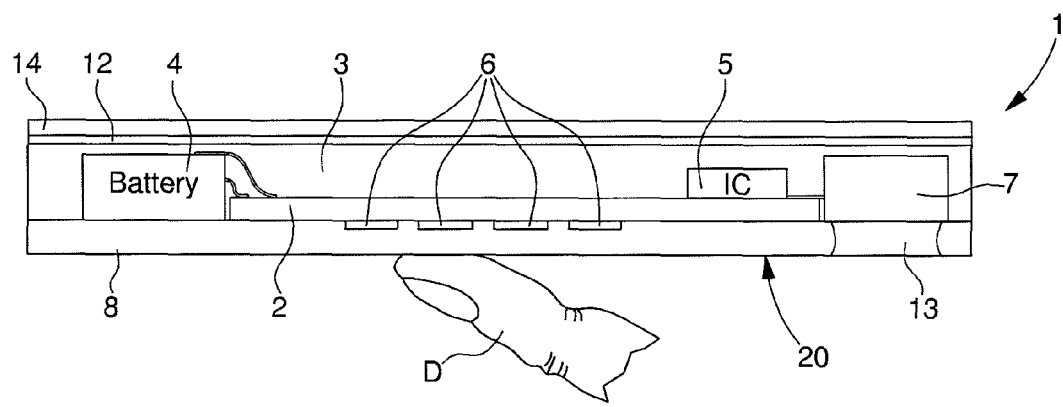
FIG. 3 represents a transverse sectional view of a third embodiment of the electronic card according to the invention.

FIG. 3 represents a transverse section of a third embodiment of the electronic card 1 according to the invention. It should be noted that all the same elements of the electronic card 1 described hereafter bear identical reference numbers to those of FIGS. 1 and 2. For this reason, for simplification the description of each element for this FIG. 3 will not be repeated in detail.

As for the second embodiment, the layer of insulating material comprises a first insulating layer 3 and a second insulating layer 8. The battery 4, the display device 7, the printed circuit board 2, the integrated circuit 5 and the electrodes of the capacitive keys 6 are encapsulated between the first and the second insulating layers.

In this third embodiment, the printed circuit board 2 which can be flexible has two faces. On a first face, at least one integrated circuit 5 for processing signals generated by the control means is connected. The connection tracks to the display device 7 can likewise be provided on this first face, and also the connection by means of the two metallic straps, to the terminals of the battery 4. In contrast, all the electrodes of the capacitive keys 6 are disposed on a second face of the printed circuit board 2 which is opposite the first face. Conductive passages, not represented, through the printed circuit board 2 can be provided for connection of the electrodes of the capacitive keys to the integrated circuit.

An opening 13 can be made in the second insulating layer 8 in order to view a display portion of the display device 7. However, instead of the opening, it can be provided that a display portion of the display device 7 is visible through at least one transparent part 13 of the second insulating layer 8.

As the capacitive keys 6 are situated on the side of the second face of the printed circuit board 2, the contact surface 20 is, in this case, on an exterior face of the second insulating layer 8. A shielding screen 12 can be produced in the form of a conductive film or a layer of opaque conductive paint which can likewise define a decoration for the electronic card. This shielding screen is disposed on the exterior surface of the first insulating layer 3. The conductive film or the layer of paint extends at least over one zone opposite all the capacitive keys 6, but may preferably cover all the exterior surface of the first insulating layer 3. A transparent protective film 14 can likewise conventionally cover completely the conductive film or the layer of paint over all the exterior surface of the first insulating layer 3.

Figure 4:
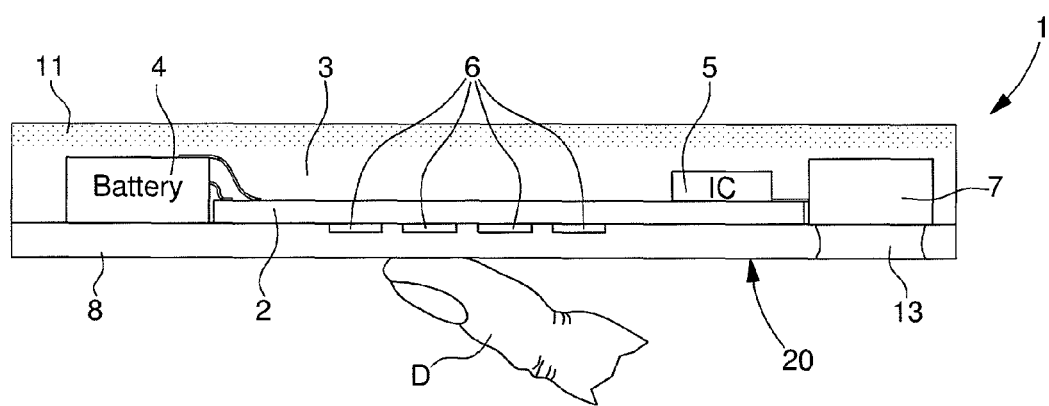
FIG. 4 represents a transverse sectional view of a fourth embodiment of the electronic card according to the invention.

FIG. 4 represents a transverse section of a fourth embodiment of the electronic card 1 according to the invention. It should be noted that all the same elements of the electronic card 1 described hereafter bear identical reference numbers to those of FIGS. 1 to 3. For this reason, for simplification the description of each element for this FIG. 4 will not be repeated in detail.

This fourth embodiment of the electronic card is substantially similar to the third embodiment of said card. The only difference in this fourth embodiment relative to the third embodiment concerns the shielding screen 11. This shielding screen 11 of this fourth embodiment is formed by conductive particles integrated in the material of the first insulating layer 3. These conductive particles are integrated with a determined thickness in the first insulating layer 3 from the exterior surface. These particles are integrated in order to cover at least one zone opposite all the capacitive keys 6, but may preferably extend over a zone corresponding to the entire exterior surface of the first insulating layer 3.

From the description which has just been given, several production variants of the electronic card can be conceived by the person skilled in the art without exceeding the scope of the invention defined by the claims. There can be provided, instead of a cell or battery, production of the electrical supply source by means of a solar cell disposed in a partially integrated manner in the electronic card. External contact areas and/or a magnetic track can be produced for the case where the electronic card is of the bank card type for connection in particular in a reader unit of a bank or of a shop. There can also be envisaged means for transmission and reception of signals without wires, such as an RFID device integrated in the card. According to the provided embodiment, the display device can be fixed on the printed circuit board without being disposed above or below the electrodes of the control means.

What is claimed is:

1. An electronic card in the form of a bank card, which comprises at least one integrated circuit, connection means to an electrical supply source in order to supply said integrated circuit, and control means which can be actuated manually and are connected to the integrated circuit for processing signals generated by the control means, said integrated circuit, the control means and at least a part of the connection means to the supply source being enclosed or encapsulated in at least one layer of insulating material forming said card, said control means being formed by an assembly of electrodes in order to define a touch screen with capacitive keys which can each be activated by means of a finger of a user or a pen placed on one contact surface of the card opposite at least one touch key for introduction of data or a command,
   wherein the electronic card comprises a conductive shielding screen disposed on one side of the electrodes of the capacitive keys which is opposite the contact surface, the conductive screen being a metal film that is remote and without contact to the capacitive keys.

2. The electronic card according to claim 1, wherein the integrated circuit is disposed on a printed circuit board.

3. The electronic card according to claim 2, wherein the electronic card includes an electrical supply source connected to the printed circuit board via connection means.

4. The electronic card according to claim 3, wherein the layer of insulating material is formed by a first insulating layer and by a second insulating layer, the supply source which is a cell or battery, the display device, the printed circuit board, the integrated circuit and the electrodes of the capacitive keys being enclosed or encapsulated between the first and the second insulating layers.

5. The electronic card according to claim 4, wherein the printed circuit board is flexible and single-face, wherein the integrated circuit and the electrodes of the capacitive keys are disposed on a first face of the printed circuit board by being encapsulated in the first insulating layer, the contact surface being situated on the exterior surface of the first insulating layer, and wherein the shielding screen is formed by a conductive film or a conductive grid disposed on the second face of the printed circuit board opposite at least all the electrodes of the capacitive keys, and enclosed in the card by the second insulating layer which is fixed to the first insulating layer.

6. The electronic card according to claim 4, wherein the printed circuit board is flexible and has two faces, wherein the integrated circuit is disposed on a first face of the printed circuit board by being encapsulated in the first insulating layer, and wherein the electrodes of the capacitive keys are disposed on a second face opposite the printed circuit board and enclosed in the card by the second insulating layer which is fixed to the first insulating layer, the contact surface being situated on the exterior surface of the second insulating layer.

7. The electronic card according to claim 6, wherein the conductive shielding screen is formed by conductive particles integrated into at least a determined thickness of the first insulating layer from the exterior surface whilst extending at least over one zone opposite all the capacitive keys.

8. The electronic card according to claim 6, wherein the conductive shielding screen is formed by a conductive film or a layer of opaque conductive paint which is disposed on the exterior surface of the first insulating layer, the conductive film or the layer of paint extending at least over one zone opposite all the capacitive keys.

9. The electronic card according to claim 2, wherein the electronic card comprises a display device connected to the integrated circuit or to a driving circuit connected to said integrated circuit, a display portion of the display device being visible through an opening made in the layer of insulating material or in the printed circuit board, said display device not being disposed above or below the assembly of electrodes of the control means, and being disposed besides the printed circuit board.

10. The electronic card according to claim 9, wherein the electronic card comprises a control member which can be activated manually, which is connected to the integrated circuit and able to control operation of the touch keys and/or of the display device.

11. The electronic card according to claim 10, wherein the control member is a switch button which can be pressed manually for a predetermined duration in order to operate the touch keys and/or the display device.

12. The electronic card according to claim 2, wherein the electronic card comprises a display device connected to the integrated circuit or to a driving circuit connected to said integrated circuit, a display portion of the display device being visible through at least one transparent part of the layer of insulating material or of the printed circuit board, said display device not being disposed above or below the assembly of electrodes of the control means, and being disposed beside the printed circuit board.

13. The electronic card according to claim 1, wherein the electronic card equally includes a memory unit for storing personal data and/or at least one personal identification code and/or configuration parameters, and a microcontroller unit connected to the memory unit, and wherein the electronic card comprises 12 electrodes of capacitive keys for each carrying out a specific function or for introduction of defined data in connection with the integrated circuit.

14. The electronic card according to claim 1, wherein the conductive shielding screen remains in a floating state.

15. The electronic card according to claim 1, wherein all the electrodes of the control means are dimensioned as a function of the approximate contact surface of a finger on the contact surface and sufficiently spaced one from the other.

* * * * *

UNITED STATES PATENT AND TRADEMARK OFFICE
CERTIFICATE OF CORRECTION

PATENT NO. : 8,381,992 B2  
APPLICATION NO. : 12/628618  
DATED : February 26, 2013  
INVENTOR(S) : Alain Hamm et al.

Page 1 of 1

It is certified that error appears in the above-identified patent and that said Letters Patent is hereby corrected as shown below:

Title Page, Item (30) should read:

(30)   Foreign Application Priority Data

Dec. 2, 2008   (EP) .............................08020862

Signed and Sealed this
Seventh Day of May, 2013

Teresa Stanek Rea
*Acting Director of the United States Patent and Trademark Office*